US012282294B2

(12) United States Patent
Terada et al.

(10) Patent No.: US 12,282,294 B2
(45) Date of Patent: Apr. 22, 2025

(54) TONER PARTICLE WITH CORE PARTICLE AND FINE PARTICLES

(71) Applicant: HEWLETT-PACKARD DEVELOPMENT COMPANY, L.P., Spring, TX (US)

(72) Inventors: Akinori Terada, Yokohama (JP); Takahiro Danno, Yokohama (JP); Osamu Ieda, Yokohama (JP)

(73) Assignee: Hewlett-Packard Development Company, L.P., Spring, TX (US)

( * ) Notice: Subject to any disclaimer, the term of this patent is extended or adjusted under 35 U.S.C. 154(b) by 733 days.

(21) Appl. No.: 17/590,315

(22) Filed: Feb. 1, 2022

(65) Prior Publication Data

US 2023/0004098 A1 Jan. 5, 2023

(30) Foreign Application Priority Data

Jul. 1, 2021 (JP) ................................. 2021-110113

(51) Int. Cl.

| | |
|---|---|
| ***G03G 9/097*** | (2006.01) |
| ***G03G 9/08*** | (2006.01) |
| ***G03G 9/093*** | (2006.01) |
| ***G03G 15/08*** | (2006.01) |

(52) U.S. Cl.

CPC ....... *G03G 9/09725* (2013.01); *G03G 9/0819* (2013.01); *G03G 9/0823* (2013.01); *G03G 9/09328* (2013.01); *G03G 9/09371* (2013.01); *G03G 9/09708* (2013.01); *G03G 15/0865* (2013.01)

(58) Field of Classification Search

CPC ........................ G03G 9/09708; G03G 9/09725

See application file for complete search history.

(56) References Cited

U.S. PATENT DOCUMENTS

| | | | | |
|---|---|---|---|---|
| 7,309,554 B2 | | 12/2007 | Miyakawa | |
| 10,539,899 B2 | | 1/2020 | Nakamura et al. | |
| 2015/0024313 A1 | * | 1/2015 | Enright | G03G 9/09708 430/108.3 |
| 2018/0129147 A1 | * | 5/2018 | Uchino | G03G 9/08797 |

FOREIGN PATENT DOCUMENTS

| | | | | |
|---|---|---|---|---|
| JP | S63-271471 | * | 11/1988 | G03G 9/08 |
| JP | 2019-164252 | | 9/2019 | |
| WO | WO 2015-147212 | * | 10/2015 | G03G 9/09708 |

OTHER PUBLICATIONS

Translation of WO 2015-147212.*
Translation of JP S63-271471.*

* cited by examiner

*Primary Examiner* — Peter L Vajda
(74) *Attorney, Agent, or Firm* — Foley & Lardner LLP

(57) ABSTRACT

A toner particle includes a core particle including a binder resin, and a plurality of fine particles that are smaller than the core particle and that are attached to a surface of the core particle. The fine particles include silica fine particles, and inorganic fine particles having a band gap energy of 2.5 to 7.0 eV and a relative permittivity of 30 to 100. The toner particle has a content of titanium dioxide of less than 1% by mass.

14 Claims, 2 Drawing Sheets

TONER PARTICLE WITH CORE PARTICLE AND FINE PARTICLES

CROSS REFERENCE TO RELATED APPLICATIONS

This application claims the priority benefit of Japanese Patent Application No. 2021-110113 filed on Jul. 1, 2021, the contents of which are incorporated herein by reference.

BACKGROUND

Methods for rendering image information visual through electrostatically charged images, such as electrophotography, have been used in a variety of fields. In electrophotography, the surface of a photoreceptor is uniformly charged, subsequently an electrostatically charged image is formed on this photoreceptor surface, an electrostatic latent image is developed with a developer including toner particles, and thereby the electrostatic latent image is rendered visual as a toner image. Then, this toner image is transferred and fixed onto the surface of a recording medium, to thereby form an image. the developer may be a two-component developer composed of toner particles and a carrier, or a one-component developer that uses a magnetic toner or a non-magnetic toner alone.

DETAILED DESCRIPTION

Figure 1:
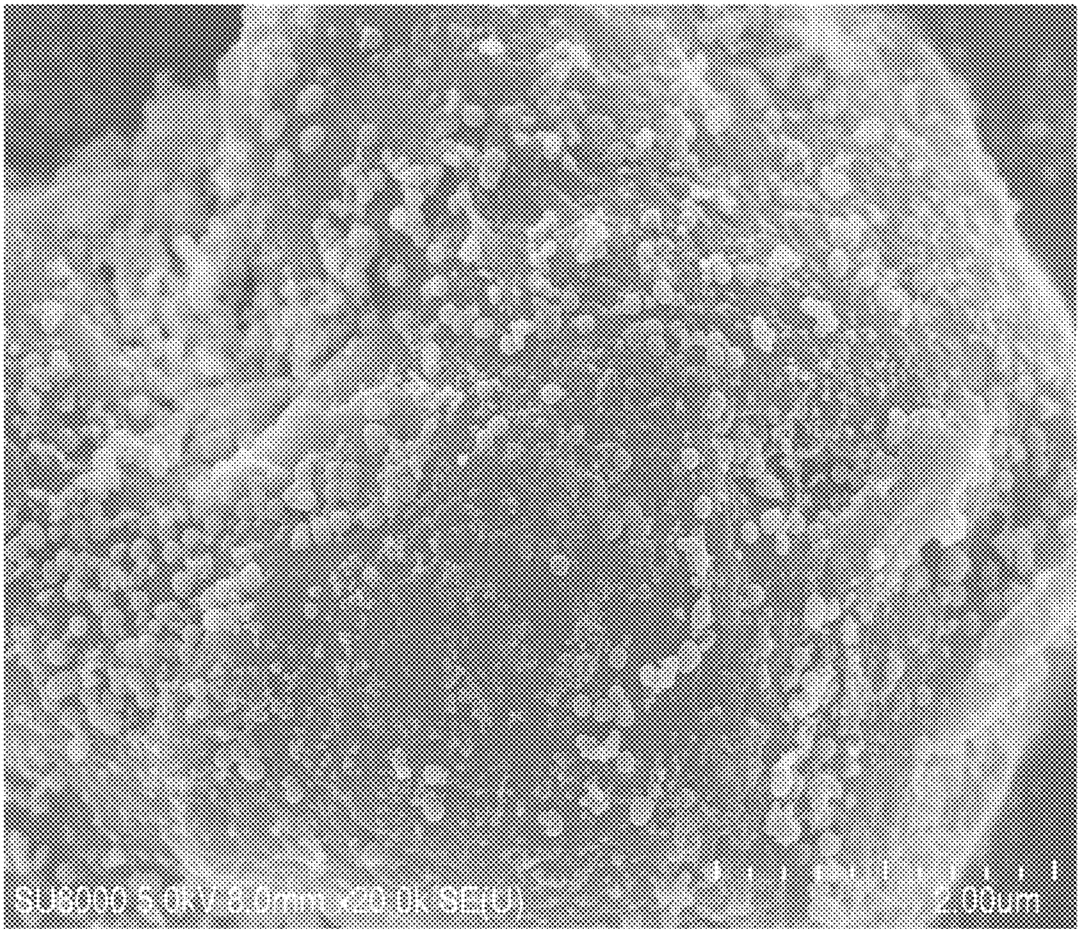
FIG. 1 is a scanning electron microscope (SEM) image showing an example toner particle.

Examples of a toner particle will now be described with reference to the drawings. In some examples, the toner particle includes a core particle and a plurality of fine particles attached to a surface of the core particle.

The core particle contains a binder resin. The binder resin includes, for example, one or more amorphous polyester resins and one or more crystalline polyester resins.

The amorphous polyester resin may be a polyester resin exhibiting no distinct endothermic peak in a differential scanning calorimetry (DSC) curve. The amorphous polyester resin may be defined as, for example, a polyester resin exhibiting a stepwise endothermic change when measured at a temperature increase rate of 10° C./min by differential scanning calorimetry, or a polyester resin exhibiting an endothermic peak with a half width of more than 15° C.

An amorphous polyester resin is, for example, a reaction product of a polyhydric alcohol and a polycarboxylic acid. In other words, the amorphous polyester resin includes, as monomer units, a polyhydric alcohol and a polycarboxylic acid.

The polyhydric alcohol may be, for example, a diol. Examples of the diol include: aliphatic diols such as ethylene glycol, diethylene glycol, triethylene glycol, propylene glycol, butanediol, hexanediol, neopentyl glycol, and glycerin; alicyclic dials such as cyclohexanediol, cyclohexanedimethanol, and hydrogenated bisphenol A; and aromatic diols such as an ethylene oxide adduct of bisphenol A and a propylene oxide adduct of bisphenol A. These polyhydric alcohols may be used singly or in combination of two or more kinds thereof. The diol may be an aromatic diol in some examples, or an alicyclic diol in other examples. In order to form a crosslinked structure or a branched structure that is provided with a suitable or improved fixability, the polyhydric alcohol may further include, in addition to a diol, a polyhydric alcohol having a valency of 3 or higher (for example, glycerin, trimethylolpropane, or pentaerythritol).

According to examples, the content of the polyhydric alcohol may be within range having a minimum of 50% by mole, 55% by mole, or 60% by mole and a maximum of 80% by mole, 75% by mole, or 70% by mole, based on the total amount of the monomer units in the amorphous polyester resin.

The polycarboxylic acid may include, for example, an aromatic polycarboxylic acid having an aromatic ring, and may include an anhydride of the aromatic polycarboxylic acid. The polycarboxylic acid may include, for example, an aromatic dicarboxylic acid, and may include an anhydride of an aromatic dicarboxylic acid. Examples of such a polycarboxylic acid include phthalic acid, isophthalic acid, terephthalic acid, tetrachlorophthalic acid, chlorophthalic acid, nitrophthalic acid, p-carboxyphenylacetic acid, p-phenylene-2-acetic acid, m-phenylene diglycolic acid, p-phenylene diglycolic acid, o-phenylene diglycolic acid, diphenylacetic acid, diphenyl-p,p'-dicarboxylic acid, naphthalene-1,4-dicarboxylic acid, naphthalene-1,5-dicarboxylic acid, naphthalene-2,6-dicarboxylic acid, anthracene dicarboxylic acid, and anhydrides of these. These polycarboxylic acids may be used singly or in combination of two or more kinds thereof.

The polycarboxylic acid may further include, for example, an aromatic polycarboxylic acid having 3 or more valences, and may further include an anhydride of an aromatic polycarboxylic acid having 3 or more valences. Examples of the polycarboxylic acid include trimellitic acid, pyromellitic acid, naphthalenetricarboxylic acid, naphthalenetetracarboxylic acid, pyrenetricarboxylic acid, pyrenetetracarboxylic acid, and acid anhydrides of these carboxylic acids.

The content of the polycarboxylic acid may be within range having a minimum of 20% by mass, 25% by mass, or 30% by mass and a maximum of 50% by mass, 45% by mass, or 40% by mass, based on the total amount of the monomer units in the amorphous polyester resin.

In order to increase the dispersibility of the crystalline polyester resin in the amorphous polyester resin, the weight average molecular weight of the amorphous polyester resin may be within a range having a minimum of 5,000, 10,000, or 12,000, and a maximum of 50,000, 45,000, or 40,000.

The weight average molecular weight of the amorphous polyester resin according to the present disclosure is measured according to gel permeation chromatography (GPC) of a tetrahydrofuran (THF)-soluble fraction. For example, the weight average molecular weight may be determined by the following method. Waters e2695 (manufactured by Nihon Waters K.K.) is used as a measuring apparatus, and two sets of Inertsil CN-3 25 cm (manufactured by GL Sciences, Inc.) are used as columns. A filtrate obtained by introducing 10 mg of the amorphous polyester resin into 10 mL of tetrahydrofuran (THF) (containing a stabilizer, manufactured by Wako Pure Chemical Industries, Ltd.), stirring the mixture for one hour, and then filtering the mixture through a 0.2 μm filter, is used as a sample solution. The sample solution is injected into the measuring apparatus in an amount of 20 μL, and measurement is made under the conditions of 40° C. and a flow rate of 1.0 mL/min.

The glass transition temperature (Tg) of the amorphous polyester resin may be within a range having a minimum of 50° C. and a maximum of 80° C. or 70° C.

The content of the first amorphous polyester resin may be within range having a minimum of 60% by mass, 70% by mass, or 80% by mass and a maximum of 95% by mass, 92% by mass, or 90% by mass, based on the total amount of the binder resin. The content of the amorphous polyester resin may be 50% by mass, 55% by mass, or 60% by mass, and may be 90% by mass, 85% by mass, or 80% by mass, based on the total amount of the toner particle.

The crystalline polyester resin may be a polyester resin exhibiting a clear endothermic peak in a modified differential scanning calorimetry (MDSC) curve. When the binder resin includes a crystalline polyester resin, enhancement of the image glossiness of the toner and enhancement of the low-temperature fixability can be promoted.

A crystalline polyester resin is, for example, a reaction product between a polyhydric alcohol and a polycarboxylic acid. For example, a crystalline polyester resin may include a polyhydric alcohol and a polycarboxylic acid as monomer units.

The polyhydric alcohol may be, for example, a diol or an aliphatic diol. In order to more easily achieve a crystalline polyester resin having an appropriate melting point for the toner particle, the number of carbon atoms of the polyhydric alcohol may be within a range having a minimum of 8 or 9 and a maximum of 12 or 10. For example, the number of carbon atoms of the polyhydric alcohol may be 9 in some examples, or 10 in other examples. Examples of the polyhydric alcohol include 1,9-nonanediol.

The content of the polyhydric alcohol may be within a range having a minimum of 30% by mass, 35% by mass, or 40% by mass, and a maximum of 60% by mass, 55% by mass, or 50% by mass, based on the total amount of monomer units in the crystalline polyester resin.

The polycarboxylic acid may be, for example, an aliphatic polycarboxylic acid. In some example, the polycarboxylic acid may be an aliphatic dicarboxylic acid to increase the linearity of the structure of the crystalline polyester resin, so as to increase the affinity with the amorphous polyester resin. In order to more easily achieve a crystalline polyester providing an appropriate melting point for the toner particle, the number of carbon atoms of the polycarboxylic acid (provided that the number of carbons excludes the carbons constituting a carboxyl group) may be within a range having a minimum of 8 or 9 and a maximum of 12 or 10. For example, the number of carbon atoms may be 9 in some examples or 10 in other examples. Examples of the polycarboxylic acid include 1,10-decane dicarboxylic acid and 1,12-dodecane dicarboxylic acid.

The content of the polycarboxylic acid may be within a range having a minimum of 40% by mass, 45% by mass, or 50% by mass, and a maximum of 70% by mass, 65% by mass, or 60% by mass, based on the total amount of monomer units in the crystalline polyester resin.

In order to suppress a decrease in the strength of the binder resin and a decrease in the glass transition temperature of the toner particle, and in order to increase low-temperature fixability, the intensity of images fixed on paper, and the preservability of the toner particle, the weight average molecular weight of the crystalline polyester resin may be within a range having a minimum of 5,000, 5,500, or 6,000, and a maximum of 15,000, 10,000, or 8,000. The weight average molecular weight of the crystalline polyester resin is measured by the same method as that for the weight average molecular weight of the amorphous polyester resin.

In order to suppress the aggregation of the toner particles and to increase the preservability of fixed images and the low-temperature fixability, the melting temperature (Tm) of the crystalline polyester may be within a range having a minimum of 60° C. and a maximum of 100° C. or 75° C.

The content of the crystalline polyester resin may be within a range having a minimum of 5% by mass, 8% by mass, or 10% by mass, and a maximum of 40% by mass, 30% by mass, or 20% by mass, based on the total amount of the binder resin. The content of the crystalline polyester resin may be within a range having a minimum of % by mass, 5% by mass, or 8% by mass, and a maximum of 30% by mass, 20% by mass, or 15% by mass, based on the total amount of the toner particle.

The binder resin may further include other resins in addition to the amorphous polyester resin and crystalline polyester resin. Examples of the other resins include a styrene-(meth)acrylic copolymer, an epoxy resin, and a styrene-butadiene copolymer. The styrene-(meth)acrylic copolymer may be a copolymer of a styrene-based monomer and a (meth)acrylic acid ester-based monomer. Examples of the styrene-based monomer include styrene, o- (m-, p-) methylstyrene and m- (p-) ethylstyrene. Examples of the (meth)acrylic acid ester-based monomer include methyl (meth)acrylate, ethyl(meth)acrylate, propyl(meth)acrylate, butyl(meth)acrylate, octyl(meth)acrylate, dodecyl(meth) acrylate, stearyl(meth)acrylate, behenyl(meth)acrylate, 2-ethylhexyl(meth)acrylate, dimethylaminoethyl(meth) acrylate, and diethylaminoethyl (meth)acrylate.

The total content of the amorphous polyester resin and crystalline polyester resin in the binder resin may be within a range having a minimum of 80% by mass, 85% by mass, or 90% by mass, and a maximum of 98% by mass or 95% by mass, based on the total amount of the binder resin.

The content of the binder resin in the toner particle may be within a range having a minimum of 40% by mass, 45% by mass, or 50% by mass, and a maximum of 90% by mass, 85% by mass, or 75% by mass, based on the total amount of the toner particle.

The core particle may further include a colorant. The colorant can include at least one colorant selected from, for example, a black colorant, a cyan colorant, a magenta colorant, and a yellow colorant. Regarding the colorant, one kind may be used alone, or two or more kinds thereof may be used as a mixture, in consideration of hue, chroma, brightness, weather-resistance, dispersibility in toner, and the like.

The black colorant may be carbon black or aniline black. The yellow colorant may be a condensed nitrogen compound, an isoindolinone compound, an anthraquine compound, an azo metal complex, or an allylimide compound. Some examples of the yellow colorant include C.I. Pigment Yellow 12, 13, 14, 17, 62, 74, 83, 93, 94, 95, 109, 110, 111, 128, 129, 147, 168, and 180.

The magenta colorant may be a condensed nitrogen compound, anthraquine, a quinacridone compound, a basic dye lake compound, a naphthol compound, a benzimidazole compound, a thioindigo compound, or a perylene compound. Some examples of the magenta colorant include C.I. Pigment Red 2, 3, 5, 6, 7, 23, 48:2, 48:3, 48:4, 57:1, 81:1, 122, 144, 146, 166, 169, 177, 184, 185, 202, 206, 220, 221, and 254.

The cyan colorant may be a copper phthalocyanine compound or a derivative thereof, an anthraquine compound, or the like. Some examples of the cyan colorant include C.I. Pigment Blue 1, 7, 15, 15:1, 15:2, 15:3, 15:4, 60, 62, and 66.

In order to achieve a sufficient a coloration effect, the content of the colorant may be within a range having a minimum of 0.5% by mass, 1% by mass, or 2% by mass, based on the total amount of the toner particle, and in order to achieve a sufficient amount of frictional electrification without having significant influence on the increase in the production cost of the toner particle, the range of the content of the colorant may have a maximum of 15% by mass, 12% by mass, or 10% by mass, based on the total amount of the toner particle.

The core particle may further include a release agent. Since the release agent increases low-temperature fixability, final image durability, and abrasion resistance of the toner particles, the type and content of the release agent may be determined in consideration of the properties of the toner.

The release agent may include, for example, a wax. The wax may be a natural wax or a synthetic wax. The wax can be selected, for example, from the group consisting of polyethylene wax, polypropylene wax, silicon wax, paraffin wax, ester wax, carnauba wax, beeswax, and metallocene wax.

The content of the release agent may be within a range having a minimum of 1% by mass, 2% by mass, or 3% by mass, based on the total amount of the toner particles, in order to achieve a suitable low-temperature fixability and a sufficient fixing temperature range, and the range may have a maximum of 20% by mass, 15% by mass, or 10% by mass, based on the total amount of the toner particles, in order to achieve suitable storage stability and economic efficiency.

The content of the core particles may be within a range having a minimum of 80% by mass, 85% by mass, or 90% by mass, and a maximum of 99% by mass, 98% by mass, or 97% by mass, based on the total amount of the toner particles.

The average particle diameter of the core particle may be within a range having a minimum of 3 μm, 4 μm, or 5 μm, and a maximum of 12 μm, 11 μm, 10 μm, or 9 μm. The average particle diameter of the core particle is measured by the method described further below with reference to Test Examples.

In some examples, the core particle may include a central portion including an amorphous polyester resin and a crystalline polyester resin as the binder resin, and a coating portion coating the central portion and including an amorphous polyester resin as the binder resin. In this case, the average particle diameter of the central portion may be within a range having a minimum of 2.8 μm, 3.5 μm, or 4.0 μm, and a maximum of 11.1 μm, 10.0 μm, or 9.0 μm. The average particle diameter of the core particle is measured by the method described further below with reference to the Test Examples. The thickness of the coating portion may be within a range having a minimum of 0.2 μm, 0.4 μm, or 0.5 μm, and a maximum of 2.0 μm, 1.4 μm, or 0.8 μm.

The toner particle contains a plurality of fine particles smaller than the core particle attached to the surface of the core particle. The fine particles include silica fine particles and specific inorganic fine particles.

The average particle diameter of the silica fine particles may be within a range having a minimum of 10 nm, 15 nm, or 20 nm, and a maximum of 250 nm, 200 nm, or 150 nm. The average particle diameter of the silica fine particles is measured by the method described further below with reference to the Test Examples. As the silica fine particles, two or more types of silica fine particles having different average particle diameters may be used in combination.

The content of the silica fine particles may be within a range having a minimum of 0.3 parts by mass, 1 part by mass, or 2 parts by mass, based on 100 parts by mass of the core particle, and a maximum of 8 parts by mass, 6 parts by mass, or 5 parts by mass, based on 100 parts by mass of the core particle.

The average particle diameter of the inorganic fine particles may be within a range of 10 to 50 nm. The lower limit of the average particle diameter of the inorganic fine particles may be 12 nm, or 15 nm, depending on examples. The upper limit of the average particle diameter of the inorganic fine particles may be 40 nm, 30 nm, or 20 nm, depending on examples. The average particle diameter of the inorganic fine particles is measured by the method described further below with reference to the Test Examples.

The band gap energy of the inorganic fine particles may be within a range of 2.5 to 7.0 eV. The lower limit of the band gap energy of the inorganic fine particles may be 2.7 eV, 3.0 eV, 3.4 eV, 4.0 eV, 4.5 eV, or 5.0 eV, depending on examples. The upper limit of the band gap energy of the inorganic fine particles may be 6.5 eV, 6.0 eV, or 5.5 eV, depending on examples. The band gap energy of the inorganic fine particles is measured by the method described further below with reference to the Test Examples.

The relative permittivity of the inorganic fine particles may be within a range of 30 to 100. The lower limit of the relative permittivity of the inorganic fine particles may be 35 or 40, depending on examples. The upper limit of the relative permittivity of the inorganic fine particles may be 90, 80, 70, 60, or 50, depending on examples. The relative permittivity of the inorganic fine particles is measured by the method described further below with reference to the Test Examples.

Such inorganic fine particles may be fine particles of metallic oxide, may be fine particles of metallic oxide containing at least one metal element selected from the group consisting of zirconium and niobium, may be fine particles of zirconium oxide or niobium oxide.

In examples where the inorganic fine particles are fine particles of the metallic oxide, the electronegativity of the metallic ion constituting the metallic oxide may be 11 to 18. The lower limit of the electronegativity may be 11.5, 12, or 12.5, depending on examples. The upper limit of the electronegativity may be 17,6, 17, 16, 15, 14, or 13. The electronegativity of the inorganic fine particles is calculated by the method described further below with reference to the Test Examples.

The inorganic fine particles may be surface-treated inorganic fine particles. The surface treatment may be a hydrophobic surface treatment. The surface treatment may be, for example, a surface treatment with a silane coupling agent.

The content of the inorganic fine particles may be within a range having a minimum of 0.1 parts by mass, 0.2 parts by mass, 0.4 parts by mass, 0.8 parts by mass, 1 part by mass, 1.2 parts by mass, or 1.4 parts by mass, based on 100 parts by mass of the core particle, and a maximum of 5 parts by mass, 4 parts by mass, 3 parts by mass, or 2 parts by mass, based on 100 parts by mass of the core particle.

The toner particle may be formed by using the inorganic fine particles as described above, to substitute titanium oxide fine particles which present environmental concerns. According to some examples, the above-described toner particle can exhibit a charge amount and charge amount stability equivalent to that of the case of using titanium oxide fine particles, without using titanium oxide fine particles. In addition, in some examples, the above-described toner particle may exhibit suitable charge rising properties among toner particles not containing titanium oxide.

The content of titanium oxide in the toner particles may be less than 1% by mass or less than 0.1% by mass, depending on examples. The content of titanium oxide in the toner particles is measured by a fluorescent X-ray method. In some examples, the toner particle does not contain titanium oxide. In the present disclosure, the toner particle not containing titanium oxide means that titanium oxide is not detected (e.g., the content of titanium oxide is negligible or less than a detection limit) when the content of titanium oxide in the toner particle is measured by the above method.

The toner particle may further contain a charge control agent in some examples. The charge control agent may be internally added so as to be contained in the core particle, or may be externally added so as to attach to the surface of the core particle. The charge control agent may be a negative charge control agent or a positive charge control agent.

Examples of the negative charge control agent include a salicylic acid metal compound, a naphthoic acid metal compound, a dicarboxylic acid metal compound, a polymer type compound having sulfonic acid or carboxylic acid in a side chain, a polymer type compound having a sulfonic acid salt or a sulfonic acid esterification product in a side chain, a polymer type compound having a carboxylic acid salt or a carboxylic acid esterification product in a side chain, a boron compound, a urea compound, a silicon compound, and a calixarene.

Examples of the positive charge control agent include a quaternary amount salt, a polymer type compound having a quaternary ammonium salt in a side chain, a guanidine compound, and an imidazole compound.

The average particle diameter of the toner particles may be, for example, within a range having a minimum of 3 μm, 4 μm, or 5 μm, and a maximum of 12 μm, 11 μm, 10 μm, or 9 μm. The average particle diameter of the toner particles is measured by the method described further below with reference to the Test Examples.

The toner particle can be used as a one-component (or single-component) developer, In order to further increase dot reproducibility and to supply stable images over a long period of time, the toner particle can be mixed with a magnetic carrier and used as a two-component developer.

Examples of the magnetic carrier include iron oxide; metal particle such as iron, lithium, calcium, magnesium, nickel, copper, zinc, cobalt, manganese, chrome, and rare earth elements; particle of alloys thereof, particle of oxides thereof; magnetic bodies such as ferrites; and a magnetic body-dispersed resin carrier (so-called resin carrier) containing a magnetic body and a binder resin that maintains the magnetic body in a dispersed state.

In a case in which the toner particles are mixed with a magnetic carrier and are used as a two-component developer, the content of the toner particle may be within a range having a minimum of 2% by mass or 4% by mass, based on the total amount of the two-component developer, and a maximum of 15% by mass or 13% by mass, based on the total amount of the two-component developer.

The toner particle may be accommodated in, for example, a toner cartridge. In some examples, the toner particle may be accommodated within a container in a toner cartridge. For example, a toner cartridge may include a container that accommodates the toner particle described above.

TEST EXAMPLES

Hereinafter, the toner particle will be described in more detail by way of Test Examples, although the toner particle is not limited to the Test Examples described.

Preparation of Amorphous Polyester Resin

The polycarboxylic acid, the polyhydric alcohol, and the esterification catalyst were introduced according to the respective the amounts (parts by mass) shown in Table 1 in a 500 ml four flask equipped with a nitrogen inlet tube, a dehydration tube, a stirrer, and a thermocouple. The mixture was heated to 230° C. under a nitrogen atmosphere, and reacted until the reaction rate reached 90%, and then reacted at 8.3 kPa until a targeted weight average molecular weight was reached, thereby obtaining amorphous polyester resin 1 and amorphous polyester resin 2.

Preparation of Crystalline Polyester Resin

The polycarboxylic acid, the polyhydric alcohol, and the esterification catalyst were introduced according to the respective the amounts (parts by mass) shown in Table 1 in a 500 ml four flask equipped with a nitrogen inlet tube, a dehydration tube, a stirrer, and a thermocouple. The mixture was heated to 180° C. under a nitrogen atmosphere, and reacted until the reaction rate reached 90%, and then reacted at 8.3 kPa until a targeted weight average molecular weight was reached, thereby obtaining a crystalline polyester resin.

Measurement of Weight Average Molecular Weight

The weight average molecular weight (Mw) of the obtained amorphous polyester resins and crystalline polyester resin was determined by gel permeation chromatography (GPC) measurement. Namely, Waters e2695 (manufactured by Nihon Waters K. K.) was used as a measuring apparatus, and Inertsil CN-3 25 cm two series (manufactured by GL Sciences Inc.) were used as a column. In addition, 30 mg of the polyester resin was added to 20 mL of tetrahydrofuran (THF) (containing a stabilizer, manufactured by Wako Pure Chemical Industries, Ltd.), stirred for one (1) hour, and then filtered with a 0.2 μm filter to obtain a filtrate, which was used as a sample. Tetrahydrofuran (THF) sample solution (20 μL) was injected into the measurement apparatus, and measurement was performed under the conditions of 40° C. and a flow rate of 1.0 mL/min.

Measurement of Glass Transition Temperature of Amorphous Polyester Resin

The glass transition temperature (Tg) of the obtained amorphous polyester resins was determined from a differential scanning calorimetry curve obtained by differential scanning calorimetry measurement specified in ASTM D3418-08. Specifically, using a DSC 02000 (manufactured by TA Instruments), the temperature was raised from room temperature to 150° C. at a rate of 10° C. per minute as a first temperature raising step, and after holding at 150° C. for 5 minutes, the temperature was lowered to 0° C. at a rate of 10° C. per minute by liquefied nitrogen. Then, after holding at 0° C. for 5 minutes, the temperature was raised again from 0° C. to 150° C. at a rate of 10° C. per minute as a second temperature raising step, and the glass transition temperature was determined from the obtained DSC curve.

Measurement of Melting Point of Crystalline Polyester Resin

The melting point (Tm) of the crystalline polyester resin was determined from a differential scanning calorimetry curve obtained by differential scanning calorimetry (DSC) as defined in ASTM D341-08. Namely, using a DSC Q2000 (manufactured by TA Instruments), the temperature was raised from room temperature to 150° C. at a rate of 10° C. per minute as a first temperature raising step, and after holding at 150° C. for 5 minutes, the temperature was lowered to 0° C. at a rate of 10° C. per minute by liquefied nitrogen. Then, after holding at 0° C. for 5 minutes, the temperature was raised again from 0° C. to 150° C. at a rate of 10° C. per minute as a second temperature raising step, and the heat absorption peak temperature at the time of melting of the crystalline polyester resin was taken as Tm from the obtained DSC curve.

Measurement of Acid Value

The acid value (mgKOH/g) of the obtained amorphous polyester resin and crystalline polyester resin was determined according to the neutralization titration method of the acid value measurement method specified in JIS K0070-1992 "Testing methods for acid value, saponification value, ester value, iodine value, hydroxyl value and unsaponifiable matter of chemical products".

The measurement results of the properties of the respective polyester resins are shown in Table 1.

TABLE 1

| | | | Unit | Amorphous polyester resin 1 | Amorphous polyester resin 2 | Crystalline polyester resin |
|---|---|---|---|---|---|---|
| Charged amount | Polycarboxylic acid | Terephthalic acid | Parts by mass | 30.4 | 30.5 | — |
| | | Trimellitic anhydride | | 1.1 | 1.0 | — |
| | | 1,12-dodecane dicarboxylic acid | | — | — | 58.0 |
| | Polyhydric alcohol | BP-2P | | 67.3 | 68.1 | — |
| | | EG | | 1.2 | 0.4 | — |
| | | 1,9-nonanediol | | — | — | 42.0 |
| | Catalysis | DBTO | | 1.0 | 1.0 | 1.0 |
| Properties of polyester resin | | Mw | dalton | 15000 | 40000 | 7000 |
| | | Tg | ° C. | 60.0 | 62.0 | — |
| | | Tm | ° C. | — | — | 70.1 |
| | | Acid value | mgKOH/g | 8.0 | 7.5 | 9.2 |

The abbreviations in Table 1 have the following meanings. BP-2P: bisphenol A propylene oxide 2 mol adduct (trade name, manufactured by Sanyo Chemical Industries, Ltd.)

EG: ethylene glycol

DBTO: dibutyltin oxide

Production of Resin Latex 1

300 g of the amorphous polyester resin 1 obtained above, 250 g of methyl ethyl ketone, and 50 g of isopropyl alcohol were introduced into a 3 L double jacket reaction vessel, and the content of the reaction vessel was stirred using a semi-moontype impeller at about 30° C. to dissolve the resin. While the obtained resin solution was stirred, 20 g of a 5% aqueous ammonia solution was slowly added to the reaction vessel, and then 1200 g of water was added thereto at a rate of 20 g/min to prepare an emulsion. Thereafter, the mixed solvent of methyl ethyl ketone and isopropyl alcohol was removed from the emulsion by a vacuum distillation method until the concentration of amorphous polyester resin 1 as a solid content reached 20% by mass, thereby obtaining resin latex 1.

Production of Resin Latex 2

Resin latex 2 was obtained in a similar manner as the resin latex 1 with the exception that the amorphous polyester resin 1 was changed to the amorphous polyester resin 2.

Production of Resin Latex 3

Resin latex 3 was obtained in a similar manner as the resin latex 1 with the exception that the amorphous polyester resin 1 was changed to the crystalline polyester resin.

Preparation of Colorant Dispersion 10 g of an anionic reactive emulsifier (HS-1, manufactured by Dai-ichi Kogyo Seiyaku Co., Ltd.) was placed in a milling bath together with 60 g of a cyan pigment (C. I, Pigment Blue 15:3, manufactured by Clariant Co., Ltd.). To this, 400 g of glass beads having a diameter of 0.8 to 1 mm were added, and milling was performed at room temperature to obtain a colorant dispersion.

Preparation of Release Agent Dispersion 270 g of a paraffin wax (HNP-9 (trade name) manufactured by Nippon Seiro Co., Ltd.), 2.7 g of an anion surfactant (Dowfax2A1 (trade name) manufactured by Dow Chemical Co., Ltd,), and 400 g of ion-exchanged water were introduced into a reaction vessel. Thereafter, the content of the reaction vessel was heated to 110° C., and the mixture was dispersed using a homogenizer (ULTRA-TURRAX T50 (trade name), manufactured by IKA), and then further dispersed using a high-pressure homogenizer (NanoVater NVL-ES 008 (trade name), manufactured by Yoshida Kikai Co., Ltd.) to obtain a release agent dispersion.

Production of Core Particle 450 g of the resin latex 1, 150 g of the resin latex 2, 100 g of the resin latex 3, and 560 g of deionized water were introduced into a 3 liter reaction vessel, Thereafter, 70 g of the colorant dispersion liquid and 80 g of the release agent dispersion liquid were added to the reaction vessel while stirring the inside of the reaction vessel, and then 30 g of nitric acid having a concentration of 0.3N and 25 g of polysilica iron PSI-100 (manufactured by SUIDO KIKO KAISHA, LTD.) were further added thereto. Thereafter, the temperature of the mixed solution in the flask was raised to 50° C. at a rate of 1° C./min while the inside of the reaction vessel was stirred using a homogenizer (ULTRA-TURRAX T50 (trade name) manufactured by IKA) to form primary aggregated particles (central portion) having a volume average particle diameter of 5.2 μm.

The volume average particle diameter of the primary aggregated particles was measured by the following method by taking out a part of the mixed solution from the reaction vessel and collecting the primary aggregated particles contained in the solution. A Coulter counter (manufactured by Beckman Coulter, Inc.) was used as a measurement device, ISOTON H (manufactured by Beckman Coulter, Inc.) was used as an electrolyte, and measurement was performed under the condition of a measured particle number of 30,000 using an aperture tube having an aperture diameter of 100 μm. Based on the measured size distribution of the particles, the volumes occupied by the particles included in the divided particle size ranges are accumulated from the small diameter side, and the size at which the accumulation is 50% is defined as a volume average particle diameter Dv50.

Thereafter, 300 g of the resin latex 1 was added to the reaction vessel while stirring the inside of the reaction vessel, and the primary aggregated particles and the amorphous polyester resin 1 in the added resin latex 1 were aggregated for 30 minutes, and the primary aggregated particles were coated with the amorphous polyester resin 1 to obtain coated aggregated particles. Thereafter, a 0.1N aqueous sodium hydroxide solution was added to the reaction vessel to adjust the pH of the mixed solution in the reaction vessel to 9.5. After 20 minutes, the temperature of the mixed solution in the reaction vessel was raised to 83° C., and the particles in the coated aggregated particles were coalesced for 2 hours to obtain core particles having a central portion and a coating portion on the outer surface thereof. Thereafter, the mixed solution in the reaction vessel was cooled to 28° C. or lower, and then filtered to collect and dry the core particles. The average particle diameter of the obtained core particles was measured in the same manner as the volume average particle diameter of the primary aggregated particles, and was found to be 5.7 μm.

Production of Inorganic Fine Particles 1

100 g of fine particles of zirconium oxide (PCS-60 (trade name) manufactured by Nippon Denko Co., Ltd.) was dispersed in 600 g of toluene, and 14% by mass of isobutyltrimethoxysilane (IBS) was added as a surface treatment agent to the fine particles of zirconium oxide, followed by dispersion and mixing for 15 minutes to bring the IBS into contact with the fine particles of zirconium oxide. The dispersion was distilled under reduced pressure, dried, and pulverized to obtain inorganic fine particles 1.

Production of Inorganic Fine Particles 2

A weakly alkaline (pH=8.4) sal containing fine particles of niobium oxide (Vila NB-G60 (trade name), manufactured by Taki Chemical Co., Ltd.) was dialyzed until the pH of the sal was lowered to 7.5. Thereafter, the sol was evaporated on a rotary evaporator to obtain inorganic fine particles 2.

Production of Inorganic Fine Particles 3

Inorganic fine particles 3 were obtained in a similar manner as the inorganic fine particles 1 with the exception that the surface treatment agent was not used.

Production of Inorganic Fine Particles 4

Inorganic fine particles 4 were obtained in a similar manner as the inorganic fine particles 1 with the exception that PCS-90 (manufactured by Nippon Denko Co., Ltd. Co., Ltd.) was used instead of PCS-60 as the fine particles of zirconium oxide.

Production of Inorganic Fine Particles 5

Inorganic fine particles 5 were obtained in a similar manner as the inorganic fine particles 1 with the exception that PCS-30 (manufactured by Nippon Denko Co., Ltd. Co., Ltd.) was used instead of PCS-60 as the fine particles of zirconium oxide.

Production of Inorganic Fine Particles 6

Inorganic fine particles 6 were obtained in a similar manner as the inorganic fine particles 1 with the exception that the surface treatment agent was changed to octyltriethoxysilane (OS).

Production of Inorganic Fine Particles 7 to 12

Inorganic fine particles 7 to 12 were obtained in a similar manner as the inorganic fine particles 1 with the exception that the types of the fine particles and the surface treatment agents shown in Tables 2A and 2B were used. In Tables 2A and 23, HMDS means hexamethyldisilazane, and the trade name of each fine particle is as follows.

Zinc oxide: ZNO-610 (manufactured by Sumitomo Osaka Cement Co., Ltd.)

Aluminum oxide: C-805 (manufactured by Evonik)

Silica: 88200 (manufactured by Nippon Aerosil Co., Ltd.)

Copper oxide (I): FRC-N10 (manufactured by Furukawa Chemicals Co., Ltd.)

Calcium titanate: TC-110 (manufactured by Titan Kogyo K. K.)

Titanium oxide: JMT 150 IB (manufactured by Tayca Corporation)

Measurement of Average Particle Diameter of Inorganic Fine Particles

For each of the obtained inorganic fine particles 1 to 10, a volume-based median diameter (Dv50) was measured as an average particle diameter using Microtrac HRA (manufactured by Microtrac Bell Inc.).

Measurement of Energy Band Gap

The energy band gap (Eg) of the obtained inorganic fine particles 1 to 12 was determined by measuring the diffuse reflection spectrum of the inorganic fine particles with a spectrophotometer according to Tauc et al. (J. Tauc, R. Grigoroveici, and A. Vancu, Phys. Status Solidi, 15 627 (1966)). Specifically, the diffuse reflection spectrum of inorganic fine particles was measured, and then Kubelka-Munk conversion was performed to convert the wavelength on the horizontal axis into eV and the vertical axis into the square root of ahv. Then, the converted spectrum in a high energy region of the obtained graph, representing a higher energy than the energy at which the absorption started, was approximated by a statistical method and was represented by a line in the graph. The converted spectrum of a low energy region representing a lower energy than the energy at which the absorption started, was approximated in the same manner and represented by another line used as a baseline. The eV value corresponding to a point at which the line of the high energy region intersects the baseline of the low energy region was calculated as an energy band gap.

Measurement of Relative Permittivity

The relative permittivity (E) of the obtained inorganic fine particles 1 to 12 were measured by an automatic balance bridge method using LCR meter HP4284A (manufactured by Agilent Technologies), TO-19 (manufactured by Ando Electric Co., Ltd.), SE-70 type solid electrode (manufactured by Ando Electric Co., Ltd.) as a measuring device, and a powder electrode cell (manufactured by SUS-made, main electrode diameter 37 mmϕ, guard electrode inner diameter 39 mmϕ/outer diameter 55 mmϕ) as an electrode cell. Specifically, as a measurement sample, a sample obtained by heat-molding inorganic fine particles into a disk shape having a thickness of 3.0±0.5 mm using a tablet molding machine was used, and an AC voltage was applied at a frequency of 1 kHz to measure the capacitance. Then, the relative dielectric constant ε of the inorganic fine particles was calculated based on the following formula.

$$\varepsilon=(t\times Cp)/[\pi\times(d/2)^2\times\varepsilon_0]$$, in which t represents a sample thickness (m), d represents a main electrode diameter (m), Cp represents a capacitance (F), and $\varepsilon_0$ represents a permittivity in vacuum (F/m), Calculation of Electronegativity of Metallic Ion The electronegativity ($\chi_i$) of the metallic ion constituting the inorganic fine particles was calculated by the method of Oguchi et al. (Oguchi, T. and M. Tamatani: J. Electrochem, Soc., 133, 841 (1986)) based on the following formula;

$$\chi_i=\chi\times(1+2z)$$, in which

χ represents a pauling electronegativity, and

Z represents a valence

The measurement results of the properties of the inorganic fine particles are shown in Tables 2A and 2B.

TABLE 2A

| Type | Inorganic fine particle 1 Zirconium oxide | 2 Niobium oxide | 3 Zirconium oxide | 4 Zirconium oxide | 5 Zirconium oxide | 6 Zirconium oxide |
|---|---|---|---|---|---|---|
| Surface treatment agent | IBS | IBS | — | IBS | IBS | OS |
| Average particle diameter (nm) | 15 | 20 | 15 | 12 | 30 | 15 |
| Band gap energy Eg (eV) | 5.1 | 3.4 | 5.1 | 5.1 | 5.1 | 5.1 |
| Relative permittivity ε | 40 | 46 | 40 | 40 | 40 | 40 |
| Electronegativity Xi | 12.6 | 17.6 | 12.6 | 12.6 | 12.6 | 12.6 |

TABLE 2B

| Type | Inorganic fine particle 7 Zinc oxide | 8 Aluminum oxide | 9 Silica | 10 Copper oxide (I) | 11 Calcium titanate | 12 Titanium oxide |
|---|---|---|---|---|---|---|
| Surface treatment agent | IBS | HMDS | HMDS | IBS | IBS | IBS |
| Average particle diameter (nm) | 60 | 15 | 12 | 100 | 100 | 15 |
| Band gap energy Eg (eV) | 3.4 | 8.8 | 9.0 | 2.2 | 3.5 | 3.1 |
| Relative permittivity ε | 8.5 | 10 | 5 | 12 | 200 | 100 |
| Electro-negativity Xi | 8 | 10.5 | 16.2 | 5.7 | 12.5 | 13.5 |

Measurement of Average Particle Diameter of Silica Fine Particles 1 to 3 As the silica fine particles 1 to 3, the following silica fine particles were used. In addition, the average particle diameter of each silica fine particles measured as a volume-based median diameter (Dv50) by the same method as in the measurement of the average particle diameter of inorganic fine particles is also shown.

Silica fine particle 1: R8200 (trade name, manufactured by Nippon Aerosil Co., Ltd., average particle diameter: 12 nm)

Silica fine particle 2: RY50 (trade name, manufactured by Nippon Aerosil Co., Ltd., average particle diameter: 40 nm)

Silica fine particle 3: X24-9163A (trade name, manufactured by Shin-Etsu Chemical Co., Ltd., average particle diameter: 110 nm)

Production of Toner Particles

Test Example 1

Figure 2:
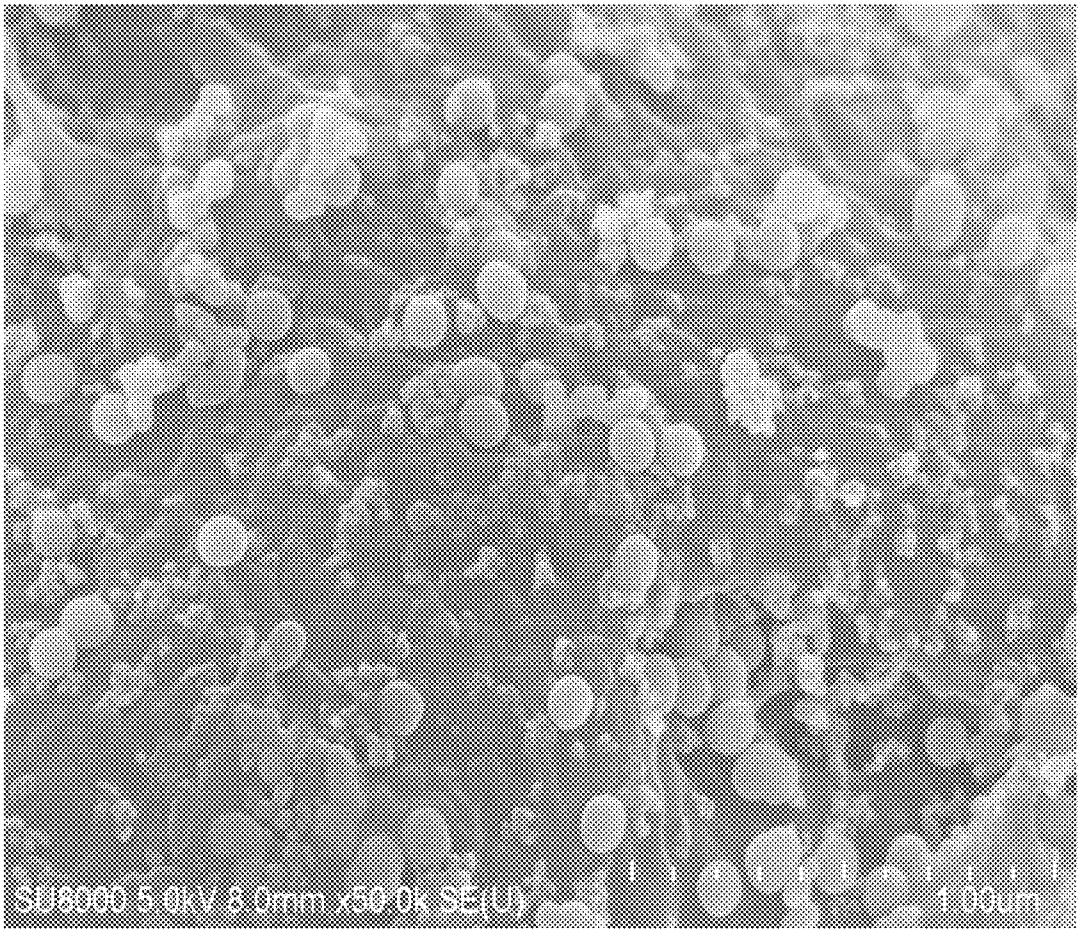
FIG. 2 is a SEM image showing an example toner particle.

After introducing 100 g of the core particles were into a mixer (KM-LS2K (trade name) manufactured by Daewha TECH), 1 g of the inorganic fine particle 1, 0.3 g of the silica fine particle 1, 1.7 g of the silica fine particle 2, and 1.7 g of the silica fine particle 3 were added. Thereafter, the mixture was stirred at a stirring speed of 8000 rpm for 4 minutes to attach the inorganic fine particle 1 and the silica fine particles 1 to 3 to the surface of the toner particle, thereby obtaining a toner particle of Test Example 1. Images of the obtained toner particles observed by a scanning electron microscope (SEM) are shown in FIG. 1 (magnification: 20,000) and FIG. 2 (magnification: 50,000).

Test Examples 2 to 9

Toner particles of Test Examples 2 to 9 were obtained in a similar manner as in Test Example 1 with the exception that the type and/or the amount of the inorganic fine particles added were varied as shown in Tables 3A and 3B.

Comparative Test 1

Toner particle of Comparative Test 1 was obtained in a similar manner as in Test Example 1 with the exception that the inorganic fine particle 1 were not used.

Comparative Tests 2 to 6 and Reference Test 1

Toner particles of Comparative Tests 2 to 6 and Reference Test 1 were obtained in a similar manner as in Test Example 1 with the exception that the type and/or the amount of inorganic fine particles added were varied as shown in Table 4.

Evaluation of Charge Amount

The obtained toner particles were subjected to the following evaluations in each environment of a high-temperature and high-humidity environment (30° C., 80% RH; hereinafter referred to as "H/H"), and a low-temperature and low-humidity environment (10° C., 10% RH; hereinafter referred to as "L/L").

Firstly, a resin-coated carrier was prepared by the following procedure.

$MnCO_3$, $Mg(OH)_2$, $SrCO_3$ and $Fe_2O_3$ were blended so that the Mn content was 21.0 mol % in terms of MnO, the Mg content was 3.3 mol % in terms of MgO, the Sr content was 0.7 mol % in terms of SrO, and the Fe content was 75.0 mol % in terms of $Fe_2O_3$. Then, water was added thereto, and the mixture was mixed while being pulverized for 10 hours in a ball mill (manufactured by Seiwa Giken). Then, calcination was performed at 950° C. for 4 hours to obtain calcined ferrite. Subsequently, the calcined ferrite was coarsely pulverized, water was added again, and the mixture was pulverized in a ball mill for 24 hours to obtain a ferrite slurry. To 100 parts by mass of the obtained ferrite slurry, 2 parts by mass of polyvinyl alcohol was added, and an appropriate amount of silica particles and ammonium polycarboxylate were added as a dispersant to stabilize the dispersion state. Then, the mixture was granulated and dried with a spray dryer (manufactured by OHKAWARA KAKOHKI Co., Ltd.) to obtain ferrite particles having an average particle diameter of about 30 μm.

Additionally, 10 parts by mass of melamine resin fine particles (Epostar S, manufactured by Nippon Shokubai Co., Ltd.) and 5 parts by mass of carbon black (Vulcan XC72, DBP oil absorption of 178 ml/100 g, manufactured by Cabot Corporation) were added to 100 parts by mass of styrene-acrylic copolymer resin in 2000 parts by mass of toluene, and the mixture was stirred to prepare a dispersion in which each component was uniformly dispersed.

To 100 parts by mass of the ferrite particles obtained above, 2.0 parts by mass of the dispersion obtained above was added, and the mixture was mixed and stirred at 60° C. for 1 hour by a spray Coating apparatus (SPIRA COTA (manufactured by Okada Seiko Co., Ltd.) to volatilize toluene. Then, the mixture was placed in a furnace at 150° C. and baked for 1 hour. Thereafter, coarse particles were removed by passing through a sieve having an opening of 75 μm to obtain a resin-coated carrier.

18.6 g of the obtained resin-coated carrier and 1.4 g of the toner particle were put into a 50 mL plastic bottle with a lid. The mixture was allowed to stand for 24 hours with the lid opened, and a sample was taken every 10 seconds while stirring with a Turbula mixier T2F type (manufactured by Willy A. Bachofen AG), and the toner average charge amount: Q/M (μC/g) was measured by the suction type Faraday cage method. Namely, the sample was directly sucked by a suction pump and collected by the Faraday cage containing a filter paper. The charge amount of the sample collected on the filter paper was measured by a q/m Meter Model 210-HS manufactured by Treck Corporation connected to the Faraday cage. The toner average charge amount SIM (μC/g) was calculated from the mass M of the collected toner particles and the charge amount Q thereof. The measurement of Q/M was carried out for 1 hour, and the highest Q/M value (peak value) in the period and the Q/M value after 20 seconds from the start of stirring are shown in Tables 3A, 3B and 4.

Evaluation of Rising Property of Charging

The ratio of the value of Q/M after 20 seconds from the start of stirring to the peak value of Q/M, which are measured above, is shown in Tables 3A, 3B and 4 as an index of the rising property of charging. The larger this ratio is, the better the rising property of charging is.

Evaluation of Charge Amount Stability

The ratio of the value of Q/M after 1 hour from the start of stirring to the peak value of Q/M, which are measured in the "H/H" above, is shown in Tables 3A, 3B and 4 as an index of the stability of the charge amount. The larger this ratio is, the better the stability of the charge amount is.

TABLE 3A

| | | | | Test Examples | | | | |
|---|---|---|---|---|---|---|---|---|
| | | | | | 2 | | | 5 |
| | | | | 1 | 2 | 3 | 4 | 1 |
| | | | | 1 | (Niobium | (Zirconium | (Zirconium | (Zirconium |
| Type of inorganic fine particle | | | | (Zirconium oxide) | oxide ) | oxide) | oxide) | oxide) |
| Amount | | Core particle | | 100 | 100 | 100 | 100 | 100 |
| (parts by mass) | | Inorganic fine particle | | 1.0 | 1.0 | 1.4 | 2.0 | 0.4 |
| | | Silica fine particle 1 | | 0.3 | 0.3 | 0.3 | 0.3 | 0.3 |
| | | Silica fine particle 2 | | 1.7 | 1.7 | 1.7 | 1.7 | 1.7 |
| | | Silica fine particle 3 | | 1.7 | 1.7 | 1.7 | 1.7 | 1.7 |
| Evaluation | Charge | Peak | H/H | 23.7 | 24.0 | 24.0 | 26.0 | 22.0 |
| results | amount | value | L/L | 37.5 | 36.0 | 36.5 | 36.5 | 35.0 |
| | (μC/g) | After 20 | H/H | 11.5 | 14.0 | 12.7 | 13.7 | 10.2 |
| | | seconds | L/L | 8.2 | 10.0 | 8.2 | 8.2 | 8.0 |
| | Rising property of | | H/H | 0.48 | 0.58 | 0.53 | 0.53 | 0.46 |
| | charging | | L/L | 0.22 | 0.28 | 0.22 | 0.22 | 0.23 |
| | Charge amount stability (H/H) | | | 0.87 | 0.90 | 0.90 | 0.91 | 0.85 |

TABLE 3B

| | | | | Test Examples | | | |
|---|---|---|---|---|---|---|---|
| | | | | 6 | 7 | 8 | 9 |
| | | | | 3 | 4 | 5 | 6 |
| Type of inorganic fine particle | | | | (Zirconium oxide) | (Zirconium oxide) | (Zirconium oxide) | (Zirconium oxide) |
| Amount | | Core particle | | 100 | 100 | 100 | 100 |
| (parts by mass) | | Inorganic fine particle | | 1.0 | 1.0 | 1.0 | 1.0 |
| | | Silica fine particle 1 | | 0.3 | 0.3 | 0.3 | 0.3 |
| | | Silica fine particle 2 | | 1.7 | 1.7 | 1.7 | 1.7 |
| | | Silica fine particle 3 | | 1.7 | 1.7 | 1.7 | 1.7 |
| Evaluation | Charge | Peak | H/H | 24.5 | 25.0 | 22.2 | 22.3 |
| results | amount | value | L/L | 35.1 | 38.0 | 35.0 | 36.5 |
| | (C/g) | After 20 | H/H | 11.4 | 12.0 | 10.3 | 10.3 |
| | | seconds | L/L | 9.7 | 9.0 | 8.0 | 8.2 |
| | Rising property of | | H/H | 0.47 | 0.48 | 0.46 | 0.46 |
| | charging | | L/L | 0.28 | 0.24 | 0.23 | 0.22 |
| | Charge amount stability (H/H) | | | 1.00 | 0.86 | 0.93 | 0.85 |

TABLE 4

| | | | | Comparative Tests | | | | | | Reference 1 |
|---|---|---|---|---|---|---|---|---|---|---|
| Type of inorganic fine particle | | | | 1 — | 2 7 (Zinc oxide) | 3 8 (Aluminum oxide) | 4 9 (Silica) | 5 10 (Copper oxide (I)) | 6 11 (Calcium titanate) | Test 12 (Titanium oxide) |
| Amount (parts by mass) | | Core particle | | 100 | 100 | 100 | 100 | 100 | 100 | 100 |
| | | Inorganic fine particle | | 0 | 1 | 1 | 1 | 1 | 1 | 1 |
| | | Silica fine particle 1 | | 0.3 | 0.3 | 0.3 | 0.3 | 0.3 | 0.3 | 0.3 |
| | | Silica fine particle 2 | | 1.7 | 1.7 | 1.7 | 1.7 | 1.7 | 1.7 | 1.7 |
| | | Silica fine particle 3 | | 1.7 | 1.7 | 1.7 | 1.7 | 1.7 | 1.7 | 1.7 |
| Evaluation results | Charge amount (μC/g) | Peak value | H/H | 37.9 | 12.0 | 20.3 | 38.7 | 13.0 | 24.0 | 25.4 |
| | | | L/L | 50.9 | 29.0 | 19.1 | 55.5 | 28.0 | 40.0 | 38.1 |
| | | After 20 seconds | H/H | 12.2 | 7.0 | 10.4 | 11.4 | 6.0 | 10.0 | 18.5 |
| | | | L/L | 8.4 | 6.0 | 4.1 | 8.9 | 5.0 | 6.0 | 11.9 |
| | Rising property of charging | | H/H | 0.32 | 0.58 | 0.51 | 0.29 | 0.46 | 0.42 | 0.73 |
| | | | L/L | 0.17 | 0.21 | 0.22 | 0.16 | 0.18 | 0.15 | 0.31 |
| | Charge amount stability (H/H) | | | 0.97 | 0.86 | 0.97 | 0.80 | 0.78 | 0.97 | 0.98 |

As demonstrated above, by using the specific inorganic fine particles, the above-described toner particles exhibit the same charge amount and charge amount stability as those in the case where titanium oxide fine particles are used, without using titanium oxide fine particles. Further, the above-described toner particles exhibit suitable charge rising property among toner particles not containing titanium oxide by using the specific inorganic fine particles.

It is to be understood that not all aspects, advantages and features described herein may necessarily be achieved by, or included in, any one particular example. Indeed, having described and illustrated various examples herein, it should be apparent that other examples may be modified in arrangement and detail is omitted.

The invention claimed is:

1. A toner particle comprising:

a core particle comprising a binder resin; and a plurality of fine particles that are smaller than the core particle and that are attached to a surface of the core particle, wherein the fine particles comprise:

silica fine particles; and inorganic fine particles having a band gap energy of 2.5 to 7.0 eV and a relative permittivity of 30 to 100, wherein the toner particle has a content of titanium dioxide of less than 1% by mass and wherein the inorganic fine particles are hydrophobic surface-treated inorganic fine particles.

2. The toner particle according to claim 1, wherein the inorganic fine particles have an average particle diameter of 10 to 50 nm.

3. The toner particle according to claim 1, wherein the inorganic fine particles are fine particles of metallic oxide, and wherein a metallic ion constituting the metallic oxide have an electronegativity of 11 to 18.

4. The toner particle according to claim 1, wherein the inorganic fine particles are fine particles of metallic oxide comprising at least one metallic element selected from the group consisting of zirconium and niobium.

5. The toner particle according to claim 1, wherein the inorganic fine particles are fine particles of zirconium oxide.

6. The toner particle according to claim 1, wherein a content of the inorganic fine particles is 0.1 to 3 parts by mass based on 100 parts by mass of the core particle.

7. The toner particle according to claim 1, wherein a content of the silica fine particles is 1 to 8 parts by mass based on 100 parts by mass of the core particle.

8. The toner particle according to claim 1, wherein the content of titanium dioxide of the toner particle is less than 0.1% by mass.

9. The toner particle according to claim 1, wherein the toner particle contains no titanium dioxide.

10. The toner particle according to claim 1, wherein the core particle has an average particle diameter of 3 to 9 μm.

11. The toner particle according to claim 1, wherein the binder resin comprises an amorphous polyester resin and a crystalline polyester resin.

12. The toner particle according to claim 10, wherein the amorphous polyester resin has a weight average molecular weight of 5000 to 50000, and wherein the crystalline polyester resin has a weight average molecular weight of 5000 to 15000.

13. The toner particle according to claim 1, wherein the core particle comprises:

a central portion comprising an amorphous polyester resin and a crystalline polyester resin as the binder resin; and a coating portion coating the central portion and comprising an amorphous polyester resin as the binder resin.

14. A toner cartridge comprising a container accommodating a toner particle, wherein the toner particle comprises:

a core particle comprising a binder resin; and a plurality of fine particles that are smaller than the core particle and that are attached to a surface of the core particle, wherein the fine particles comprise:

silica fine particles; and inorganic fine particles having a band gap energy of 2.5 to 7.0 eV and a relative permittivity of 30 to 100, wherein the toner particle has a content of titanium dioxide of less than 1% by mass and wherein the inorganic fine particles are hydrophobic surface-treated inorganic fine particles.

* * * * *